US010393302B2

United States Patent
Dill et al.

(10) Patent No.: US 10,393,302 B2
(45) Date of Patent: Aug. 27, 2019

(54) DOUBLE WALL TUBE BOLTED FLANGE FITTING

(71) Applicant: United Technologies Corporation, Hartford, CT (US)

(72) Inventors: Steven Dill, Glastonbury, CT (US); David E. Diaz, Dorado, PR (US); Matthew J. Howlett, North Haven, CT (US)

(73) Assignee: United Technologies Corporation, Farmington, CT (US)

( * ) Notice: Subject to any disclaimer, the term of this patent is extended or adjusted under 35 U.S.C. 154(b) by 778 days.

(21) Appl. No.: 14/619,704

(22) Filed: Feb. 11, 2015

(65) Prior Publication Data

US 2015/0369413 A1     Dec. 24, 2015

Related U.S. Application Data

(60) Provisional application No. 62/095,298, filed on Dec. 22, 2014, provisional application No. 62/013,755, filed on Jun. 18, 2014.

(51) Int. Cl.
*F16L 39/00*     (2006.01)
*F16L 9/18*      (2006.01)
(Continued)

(52) U.S. Cl.
CPC ............... *F16L 39/005* (2013.01); *F16L 9/18* (2013.01); *F16L 23/12* (2013.01); *F16L 23/16* (2013.01);
(Continued)

(58) Field of Classification Search
CPC ......... F16L 39/005; F16L 23/12; F16L 23/16; F16L 23/167; F16L 9/18; F16L 43/001; F16L 2201/30; B23K 1/0008; G01M 3/04
(Continued)

(56) References Cited

U.S. PATENT DOCUMENTS 1,217,543 A * 2/1917 White ................... F16L 39/005
                                                     285/123.15
2,695,182 A    11/1954 Folz
(Continued)

FOREIGN PATENT DOCUMENTS

FR       2342454 A1    9/1977
WO   WO2013086191 A1    6/2013

OTHER PUBLICATIONS

Examination Report for EP Application No. 15171988.7, dated May 19, 2017, 5 Pages.
(Continued)

*Primary Examiner* — Greg Binda
*Assistant Examiner* — Zachary T Dragicevich
(74) *Attorney, Agent, or Firm* — Kinney & Lange, P.A.

(57) ABSTRACT

A flange fitting for attaching to double wall tubes includes a fitting center port, a plurality of fitting mounts, inner and outer seal surfaces, fluid communication ports, and a connections surface. The fitting center port extends through the fitting for passing a primary fluid flow. The fitting mounts are spaced radially away from the center port for receiving fasteners. The inner and outer seal surfaces are predominantly flat. The fluid communication ports for pass a secondary fluid flow and fluid communication ports extend through the fitting from between the inner and outer seal surfaces to the connection surface between the inner sleeve connection and the outer connection. The connection surface is on a side of the fitting opposing the seal surfaces. The connection surface includes an inner sleeve connection and an outer connection.

15 Claims, 10 Drawing Sheets

(51) Int. Cl.
*F16L 23/12* (2006.01)
*F16L 23/16* (2006.01)
*F16L 43/00* (2006.01)
*G01M 3/04* (2006.01)
*B23K 1/00* (2006.01)

(52) U.S. Cl.
CPC .......... *B23K 1/0008* (2013.01); *F16L 23/167* (2013.01); *F16L 43/001* (2013.01); *F16L 2201/30* (2013.01); *G01M 3/04* (2013.01)

(58) Field of Classification Search
USPC ...... 285/123.3, 123.12, 123.14, 123.15, 368, 285/412
See application file for complete search history.

(56) References Cited

U.S. PATENT DOCUMENTS

| | | | |
|---|---|---|---|
| 3,233,927 A | 2/1966 | Dewhirst | |
| 3,317,221 A | 5/1967 | Brown | |
| 3,612,577 A | 10/1971 | Pope et al. | |
| 3,942,807 A * | 3/1976 | Dinger | |
| 3,970,335 A | 7/1976 | Curington et al. | |
| 4,067,596 A | 1/1978 | Kellner et al. | |
| 4,130,304 A * | 12/1978 | Hebard | 285/123.14 |
| 4,723,441 A | 2/1988 | Sweeney | |
| 4,732,414 A | 3/1988 | Inaba | |
| 4,890,865 A | 1/1990 | Hosono et al. | |
| 5,199,747 A | 4/1993 | Jahr | |
| 5,494,318 A | 2/1996 | Butts et al. | |
| 5,611,373 A | 3/1997 | Ashcraft | |
| 5,931,184 A | 8/1999 | Armenia et al. | |
| 6,231,086 B1 | 5/2001 | Tierling | |
| 6,402,159 B1 * | 6/2002 | Kohn | F16L 23/16 |
| 6,428,054 B1 | 8/2002 | Zappa et al. | |
| 6,464,261 B1 | 10/2002 | Dybevik et al. | |
| 6,513,838 B2 | 2/2003 | Poehler | |
| 6,520,213 B1 | 2/2003 | Esser | |
| 6,701,967 B2 | 3/2004 | Louis et al. | |
| 6,854,487 B2 | 2/2005 | Witemyre et al. | |
| 6,886,388 B1 | 5/2005 | McGill et al. | |
| 8,172,272 B2 | 5/2012 | Petit et al. | |
| 8,308,200 B1 * | 11/2012 | Barnes | F16L 39/005 285/123.15 |
| 8,820,794 B1 * | 9/2014 | Betz | 285/123.15 |
| 8,944,749 B2 | 2/2015 | Durocher et al. | |
| 9,234,614 B2 * | 1/2016 | Norris | F16L 23/12 |
| 2001/0012476 A1 | 8/2001 | Louis et al. | |
| 2003/0184092 A1 | 10/2003 | Hiller et al. | |
| 2004/0026922 A1 | 2/2004 | Carns et al. | |
| 2005/0120534 A1 | 6/2005 | Carns et al. | |
| 2006/0108791 A1 | 5/2006 | Chen et al. | |
| 2007/0246117 A1 | 10/2007 | Naganawa et al. | |
| 2007/0262075 A1 | 11/2007 | Lee et al. | |
| 2008/0203669 A1 | 8/2008 | Schippl et al. | |
| 2009/0079185 A1 | 3/2009 | Carbines-Evans et al. | |
| 2009/0145506 A1 * | 6/2009 | Queau | F16L 39/005 |
| 2010/0018599 A1 | 1/2010 | Ferrer et al. | |
| 2010/0275572 A1 | 11/2010 | Durocher et al. | |
| 2011/0025050 A1 | 2/2011 | Holler | |
| 2011/0154856 A1 | 6/2011 | Andrian et al. | |
| 2011/0154886 A1 | 6/2011 | Carns et al. | |
| 2012/0217739 A1 | 8/2012 | Weinhold | |
| 2013/0000747 A1 | 1/2013 | Buresi et al. | |
| 2013/0087238 A1 | 4/2013 | Mercier | |
| 2013/0160886 A1 | 6/2013 | Wright, Jr. | |
| 2013/0181439 A1 | 7/2013 | Alhaug | |
| 2013/0312865 A1 | 11/2013 | Baur et al. | |
| 2015/0337681 A1 | 11/2015 | Scott et al. | |
| 2015/0369400 A1 | 12/2015 | Dill | |

OTHER PUBLICATIONS

Extended European Search Report for EP Application No. 15171988.7, dated Nov. 16, 2015, 11 pages.
Extended European Search Report for EP Application No. 15810126.1, Dated May 24, 2017, 9 Pages.
International Search Report and Written Opinion for PCT Application No. PCT/US2015/015397, Dated May 21, 2015, 14 Pages.
International Preliminary Report on Patentability for PCT Application No, PCT/US2015/015397, Dated Dec. 20, 2016, 12 Pages.
Extended European Search Report for European Patent Application No. 15171503.4, dated Nov. 5, 2015, 8 pages.

* cited by examiner

Fig. 5
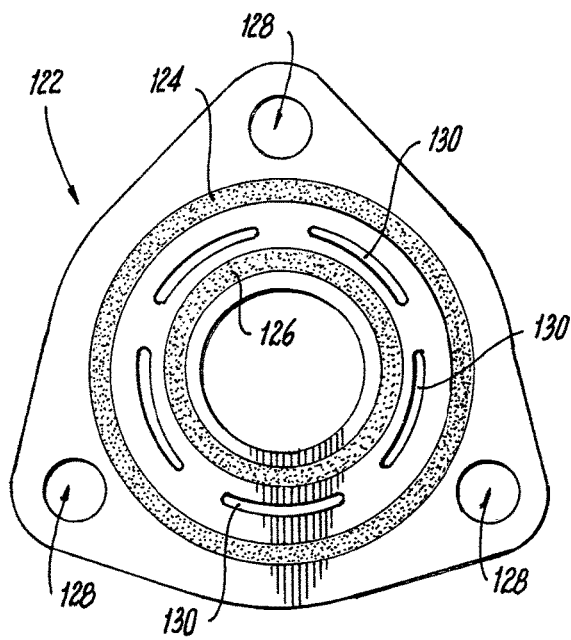
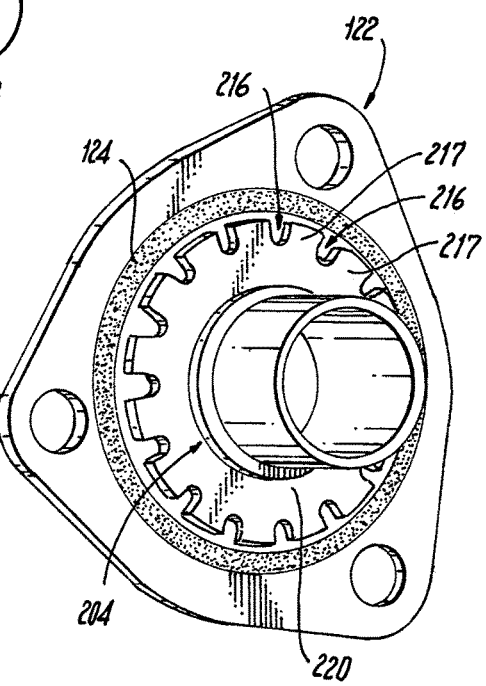
Fig. 6
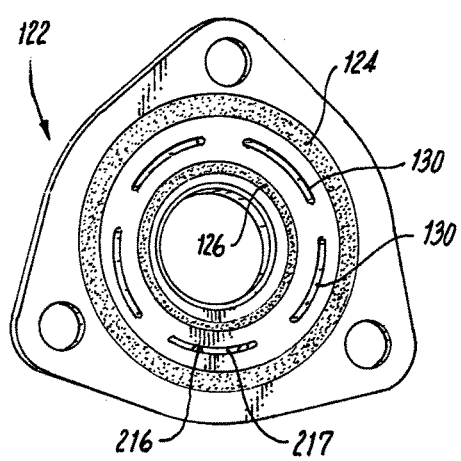
Fig. 7

DOUBLE WALL TUBE BOLTED FLANGE FITTING

CROSS-REFERENCE TO RELATED APPLICATION(S)

This application claims priority to U.S. Provisional Application No. 62/013,755 filed on Jun. 18, 2014, which is fully incorporated by reference. This application claims priority to U.S. Provisional Application No. 62/095,298 filed on Dec. 22, 2014, which is fully incorporated by reference.

BACKGROUND

Tubes or pipes are often used to transport various fluids to or from various components within different systems. Tubes or pipes are often constructed from rigid, but smooth materials. Tubes or pipes are designed to be rigid to avoid failure or breaking of a tube, but designed to be internally smooth to allow for fluid to be transported through the tubes with minimal pressure loss. Although tubes and pipes are designed to be strong to avoid failure, they are also often manufactured with a thin wall thickness. This practice saves manufacturing costs and decreases the weight of the tubes. For example, the weight decrease may increase system efficiency when a tube is a component within a movable system, such as an automobile or aircraft.

Tubes may be used to carry high pressure fluids such as oil, gas, air, or water. When the tubes carry flammable substances, such as oil or gas, safety is a concern. More specifically, leaks of flammable fluids caused by pipe or tube failures, or failed connections between tubes or pipes and fittings, are a major safety concern. One solution to this problem is to use double-wall tubes or pipes. A double wall pipe or tube is simply a secondary tube surrounding a primary tube. In some instances flow is designed to flow in both tubes. In other instances, flow is designed to flow in the primary (inner) tube and the secondary (outer) tube is designed to prevent leakage. The latter of these instances provides safety and redundancy required in aviation.

SUMMARY

A flange fitting for attaching to double wall tubes includes a fitting center port, a plurality of fitting mounts, inner and outer seal surfaces, fluid communication ports, and a connections surface. The fitting center port extends through the fitting for passing a primary fluid flow. The fitting mounts are spaced radially away from the center port for receiving fasteners. The inner and outer seal surfaces are predominantly flat. The fluid communication ports pass a secondary fluid flow and extend through the fitting from between the inner and outer seal surfaces to the connection surface between the inner sleeve connection and the outer connection. The connection surface is on a side of the fitting opposing the seal surfaces. The connection surface includes an inner sleeve connection protruding from the connection surface surrounding the center port for receiving an inner tube and an outer connection protruding from the connection surface surrounding the inner sleeve connection for receiving an outer tube.

In another embodiment, a flange fitting assembly for connecting double wall tubes includes a first and second flange fitting for connecting to first and second double wall tubes, respectively, and to each other and a seal plate for mounting between the first flange fitting and second flange fitting. Each flange fitting includes a fitting center port, a plurality of fitting mounts, inner and outer seal surfaces, fluid communication ports, and a connections surface. The fitting center port extends through the fitting for passing a primary fluid flow. The fitting mounts are spaced radially away from the center port for receiving fasteners. The inner and outer seal surfaces are predominantly flat. The fluid communication ports pass a secondary fluid flow and extend through the flange fitting from between the inner and outer seal surfaces to the connection surface between the inner sleeve connection and the outer connection. The connection surface is on a side of the flange fitting opposing the seal surfaces. The connection surface includes an inner sleeve connection protruding from the connection surface surrounding the center port for receiving an inner tube and an outer connection protruding from the connection surface surrounding the inner sleeve connection for receiving an outer tube. Each seal plate includes a plate center port, a plurality of plate mounts, a plurality of slots, a first and second side, and an inner and outer seal. The plate center port has an axis that is in alignment with a center axis of the fitting center port. The plurality of plate mounts is for receiving fasteners. The plate mounts are spaced radially away from the plate center port. The plurality of slots extend through the seal plate, located between the inner and outer seal of each side for passing a secondary fluid flow between the fluid communication ports of the first and second fittings. The first and second sides are identical. Each side of the seal plate includes an inner seal circumscribing the plate center port and an outer seal located radially between the plate mounts and the inner seal.

Another embodiment includes a method of manufacturing a double wall tube and flange fitting assembly, which includes applying braze material to a first end of an inner tube. Then the inner tube is inserted into an inner sleeve connection of a first flange fitting. Next, the outer tube is slid over the inner tube and the outer tube is butted against an outer connection of the first flange fitting. Then the outer tube is welded to the outer connection and the first end of the inner tube is brazed to the inner sleeve connection.

BRIEF DESCRIPTION OF THE DRAWINGS

FIG. 5 is an end elevation view of a seal assembly for sealing the two double wall assemblies of FIG. 2 together, showing the axial seals on one side of the seal assembly.

FIG. 6 is a perspective view of the seal assembly of FIG. 5, showing the seal assembly together with another exemplary embodiment of a sleeve fitting.

FIG. 7 is a perspective view of the seal assembly and sleeve fitting of FIG. 6 viewed from a side generally opposite that shown in FIG. 6, showing the passages defined through the seal assembly and sleeve fitting.

DETAILED DESCRIPTION

Figure 1:
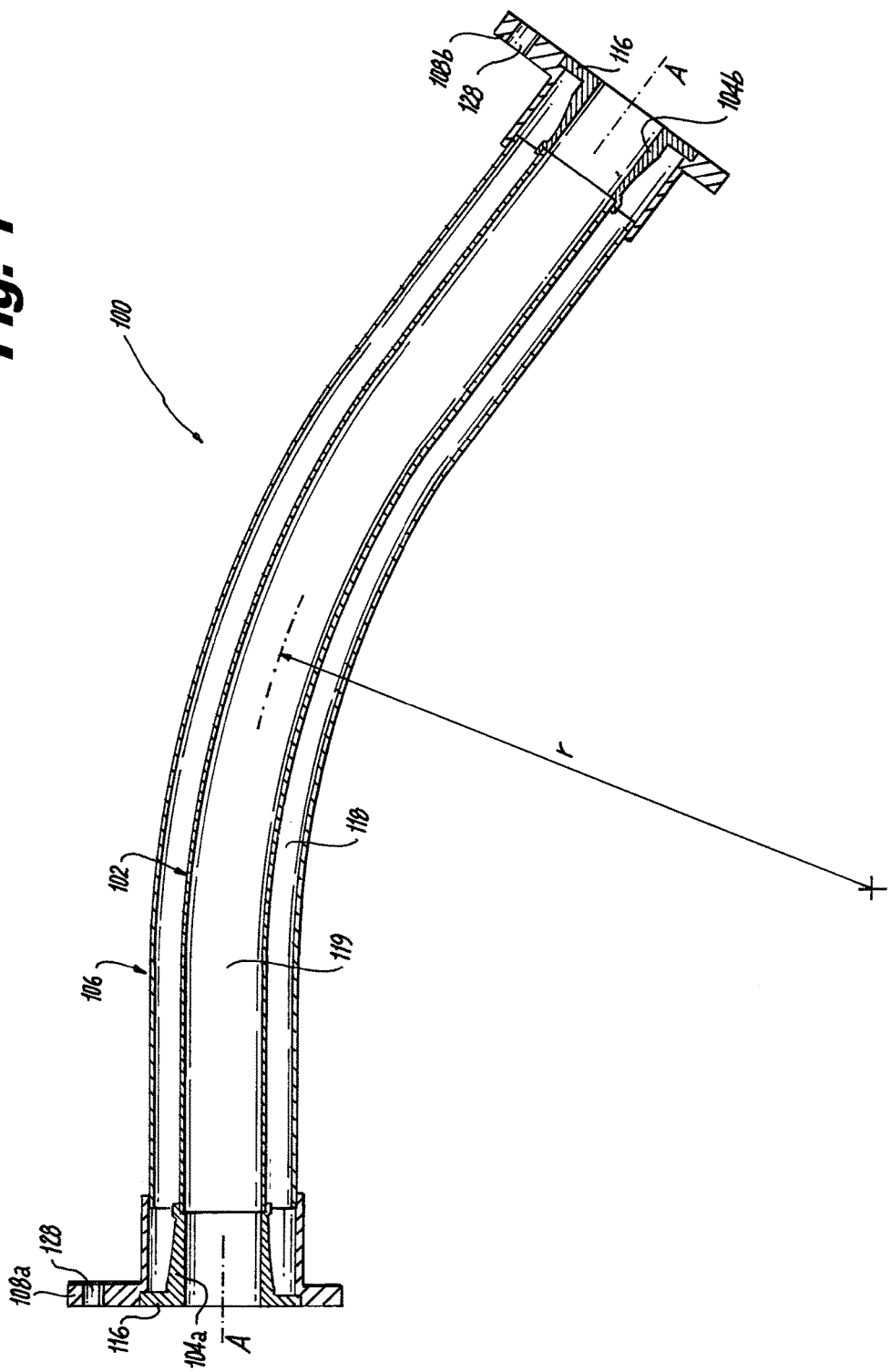
FIG. 1 is a cross-sectional side elevation view of an exemplary embodiment of a double wall tube assembly constructed in accordance with the present disclosure, showing the inner and outer tubes.

Reference will now be made to the drawings wherein like reference numerals identify similar structural features or aspects of the subject disclosure. For purposes of explanation and illustration, and not limitation, a partial view of an exemplary embodiment of a double wall tube assembly in accordance with the disclosure is shown in FIG. 1 and is designated generally by reference character 100. Other embodiments of double wall tube assemblies in accordance with the disclosure or aspects thereof, are provided in FIGS. 2-16, as will be described. The systems and methods described herein can be used to provide redundancy, for example for conducting engine fluids through engines in aerospace applications. Another potential use is for co-axial flow, e.g., in a heat exchanger.

Double wall tube assembly 100 includes an inner tube 102 extending in an axial direction between two opposed ends of the inner tube 102, i.e., inner tube 102 extends along the curved axis A. The axial direction follows a bend radius r. A sleeve fitting 104a is mounted to one end of inner tube 102. An outer tube 106 outboard of inner tube 102 extends in the axial direction between two opposed ends of outer tube 106, i.e., the inner and outer tubes 102 and 106 each follow the bend radius r. A collar fitting 108a is mounted to one end of outer tube 106 wherein collar fitting 108a is outboard of sleeve fitting 104a.

A second sleeve fitting 104b is mounted to an end of the inner tube 102 opposite the first sleeve fitting 104a. A second collar fitting 108b is mounted to an end of outer tube 106 opposite the first collar fitting 108a. Inner tube 102 is longer in the axial direction than outer tube 106. The collar fittings 108a and 108b are longer in the axial direction than the sleeve fittings 104a and 104b.

Figure 2:
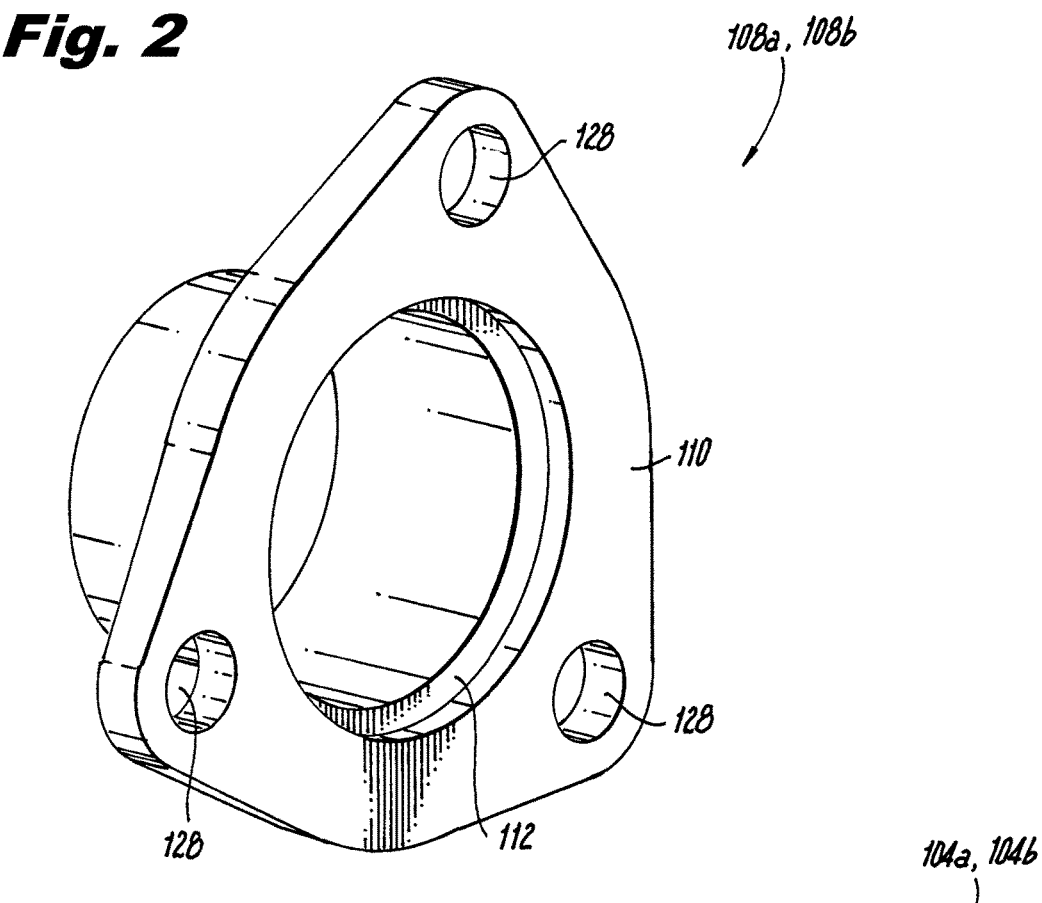
FIG. 2 is a perspective view of a portion of the double wall tube assembly of FIG. 1, showing one of the collar fittings.

With reference now to FIG. 2, each of the first and second collar fittings 108a and 108b can include an axial end face 110 defining a respective seat 112. As shown in FIG. 1, a respective one of the first and second sleeve fittings 104a and 104b is seated in the seat 112 of each respective collar fitting 108a and 108b to suspend inner tube 102 inside outer tube 106.

Figure 3:
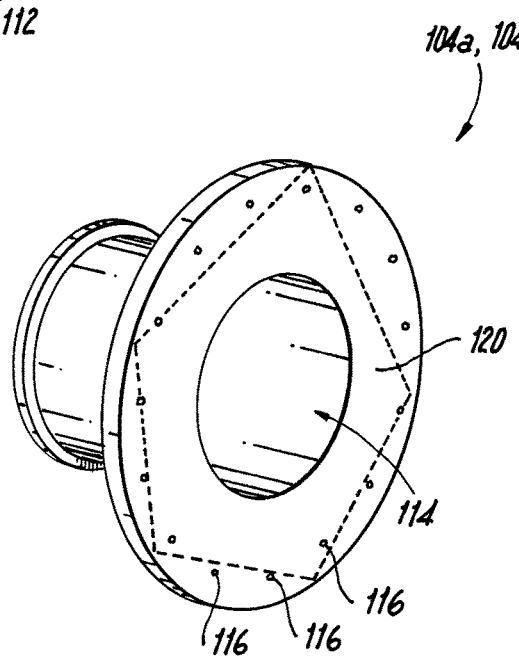
FIG. 3 is a perspective view of a portion of the double wall tube assembly of FIG. 1, showing one of the sleeve fittings.

Referring now to FIG. 3, each sleeve insert 104a and 104b can define a central bore 114 therethrough for fluid communication through sleeve fittings 104a and 104b and inner tube 102. Each sleeve insert 104a and 104b also defines at least one peripheral passage 116 (only some of which are identified in FIG. 3 with reference characters for sake of clarity) outboard of central bore 114 for fluid communication through sleeve fittings 104a and 104b and a passage 118 defined between the inner and outer tubes 102 and 106, as shown in FIG. 1, as described further below with reference to FIG. 7. In the example shown in FIG. 3, the peripheral passages 116 define axial bores through a radially extending flange 120 of each sleeve fitting 104a and 104b. It is also contemplated that the at least one peripheral passage 216 can define a perimeter recess such as the spaces between castellations 217 in a radially extending flange 220 in the exemplary embodiment of a sleeve fitting 204 shown in FIG. 6. It is also contemplated that any other suitable type of perimeter recess can be used, such as by making flange 220 have a polygonal periphery such as a pentagon, as indicated by the dashed lines in FIG. 3. In this case, the edges between the points of the pentagon provide peripheral passages.

Figure 4:
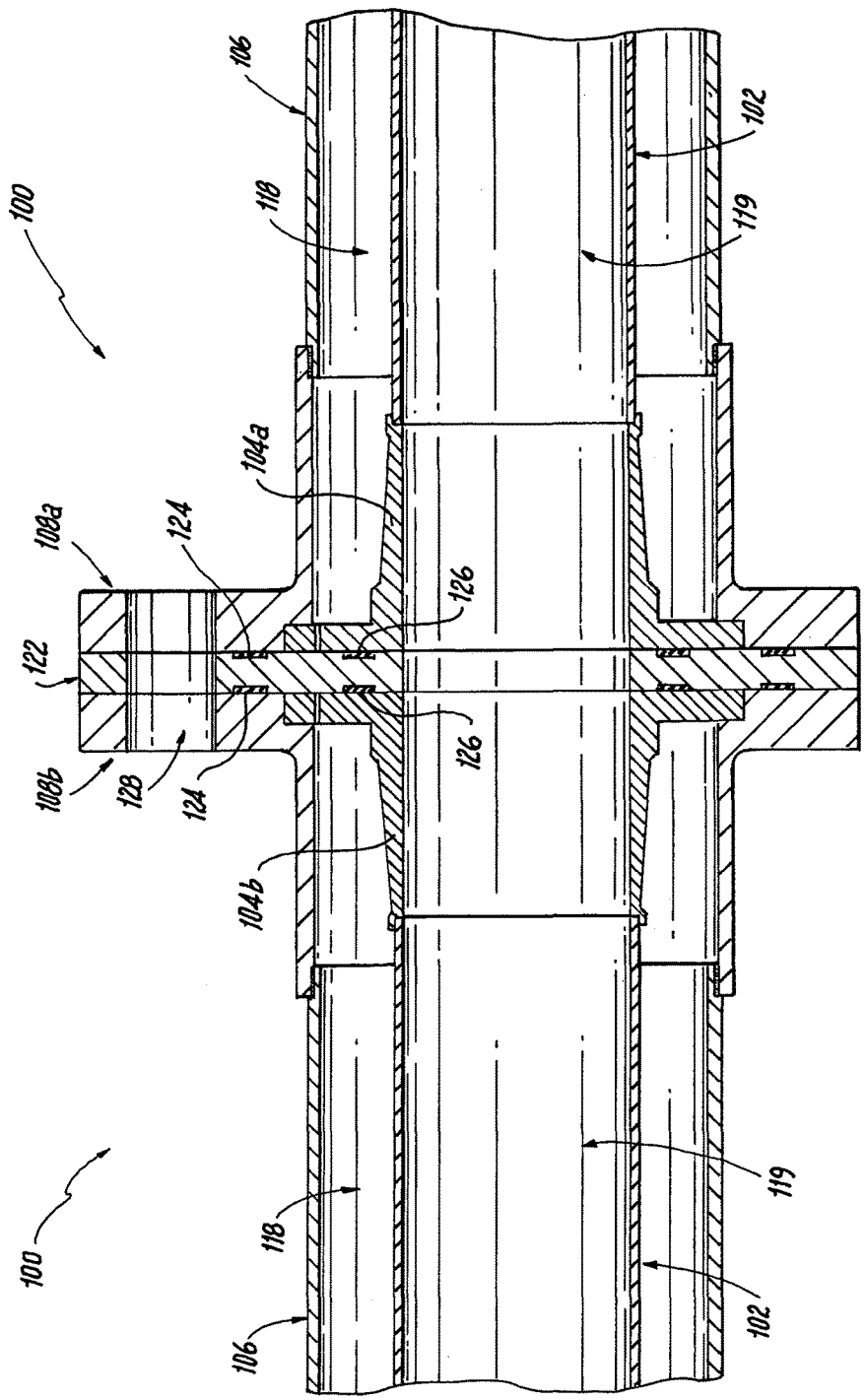
FIG. 4 is a cross-sectional side elevation view of the double wall tube assembly of FIG. 1, showing two such tube assemblies joined together.

With reference now to FIG. 4, a junction of two tube assemblies 100 is described. In FIG. 4, on the left is shown one end of a tube assembly 100 as described above, with the end having sleeve fitting 104b and collar fitting 108b shown. On the right in FIG. 4 is shown a second tube assembly 100 as described above, with the end having collar fitting 108a and sleeve fitting 104a shown. A seal assembly 122 sealingly engages between the collar fittings 108a and 108b with axial seals 124, which are axially compressed o-rings. Those skilled in the art will appreciate that any other type of seal can be used in addition to or in lieu of o-rings, such as a vulcanized seal. Seal assembly 122 also sealingly engages between the first and second sleeve fittings 104a and 104b with axial seals 126, which are axially compressed o-rings. This sealing arrangement allows for fluid isolation of flows through the junction of the two tube assemblies between the inner passage 119 of the inner tubes 102 and the outer passage 118. The two tube assemblies can be bolted together with a bolt passing through bores 128 formed through the collar fittings 108a and 108b and through seal assembly 122. Only one of three bores 128 is shown in FIG. 4, but see FIGS. 2 and 5, where all three bores are shown in the collar fittings 108a and 108b and in seal assembly 122. While shown as circular, it is also contemplated that bores 128 can be elongated circumferentially around axis A, i.e., kidney bean shaped, for example to accommodate cumulative mismatches in configurations with multiple tube assemblies 100 attached end to end. Simply removing the three flange bolts frees the double walled coupling allowing the tube assemblies 100 to be removed.

With reference now to FIG. 5, seal assembly 122 includes five passages 130, although any other suitable number can be used, for passage of fluids between axial seals 124 and 126. In FIG. 6, seal assembly 122 is shown aligned with sleeve fitting 204. As shown in FIG. 7, the reverse side of seal assembly 122 is shown from that in FIG. 6, to show alignment of peripheral passages 216 and passages 130 to permit flow through the junction of two tube assemblies 100, wherein the main flow through the central passage is sealed off through the junction from flow through passages 130 for the outer passage 118 shown in FIG. 1. This can be used, for example, to collect fluid in outer passage 118 leaked from the main flow for conveyance to a drain or the like, without junctions such as that shown in FIG. 4 adding to the leakage.

Figure 8:
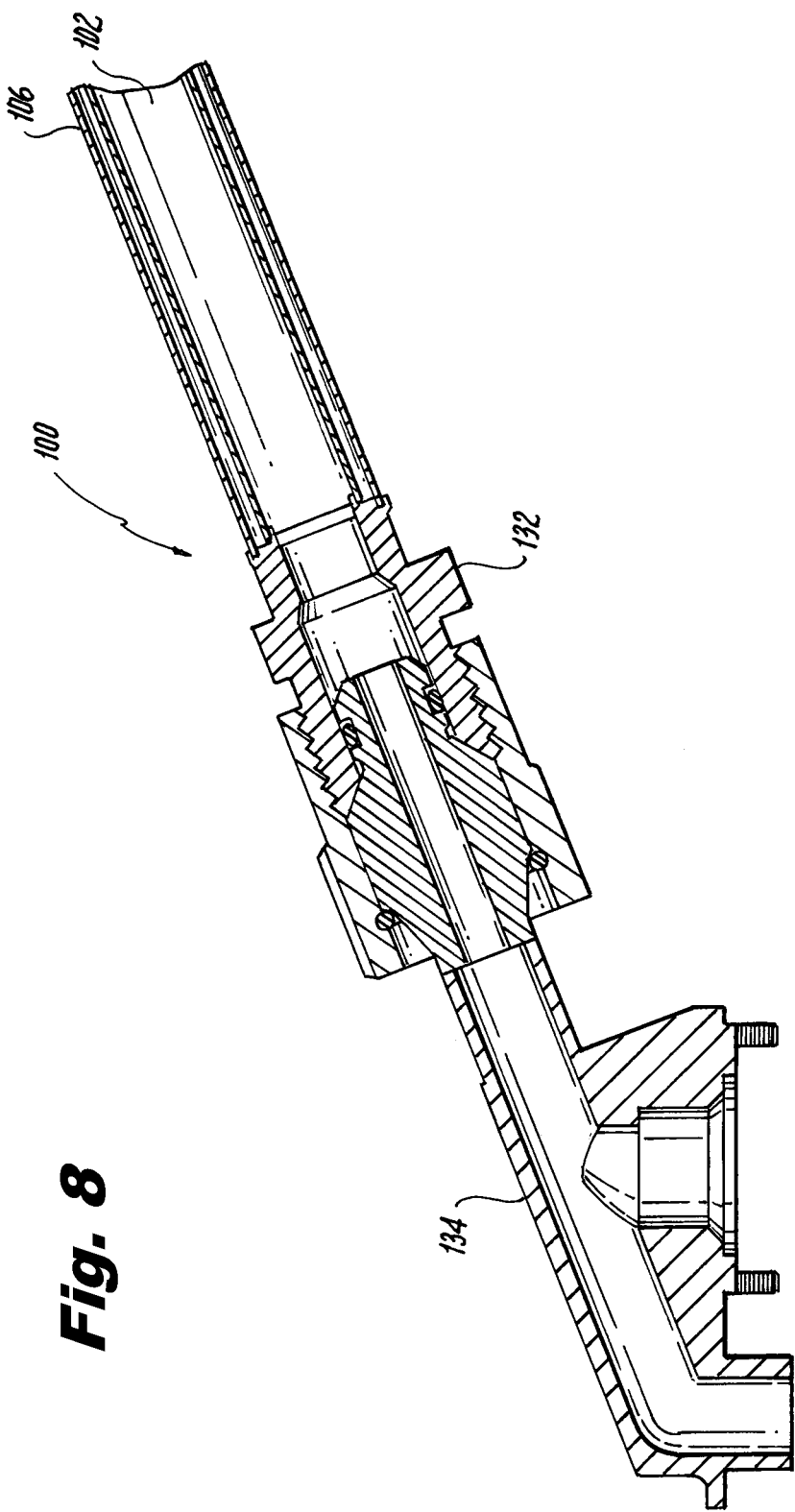
FIG. 8 is a cross-sectional elevation view of a portion of an exemplary embodiment of a double wall tube assembly, showing and end of the assembly mounted to a double seal coupling.

Referring to FIG. 8, it is contemplated that in lieu of collar and sleeve fittings, one end of tube assembly 100 can be mounted to a double sealed coupling 132 or other suitable interface to connect tube assembly 100, or a plurality of connected tube assemblies, to an engine component. Double sealed coupling 132 is exemplary, and can be any suitable fitting, e.g., a fitting that has co-axial weld ends that are offset axially to accommodate double wall tube. In the example shown in FIG. 8, tube assembly 100 is mounted to double sealed coupling 132, which is welded to one end of each of the inner and outer tubes 102 and 106. The opposite end of tube assembly, i.e., the end not shown in FIG. 8, can be mounted to sleeve and collar fittings 104b and 108b as described above for mounting to another tube assembly 100, e.g., as depicted in FIG. 4, for example. Double sealed coupling 132 provides an interface between tube assembly 100 and a fixture 134, which can provide fluid communication into an engine compartment, for example.

Figure 9:
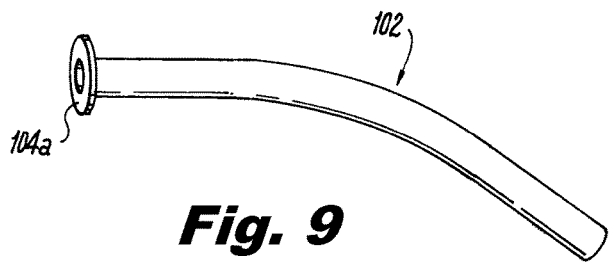
FIGS. 9-12 show exemplary stages of assembly in accordance with an embodiment of a method of assembling a double wall tube assembly in accordance with this disclosure.
Figure 10:
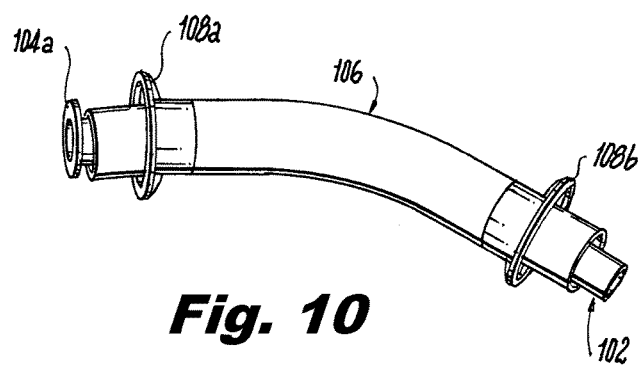

With reference now to FIGS. 9-12, an exemplary method of assembling tube assemblies such as tube assemblies 100 is described. As shown in FIG. 9, a first sleeve fitting 104a is mounted to an end of an inner tube 102, e.g., with a butt weld such as by orbital welding. An outer tube 106 and a pair of opposed collar fittings 108a and 108b are positioned about the inner tube 102 as shown in FIG. 10. Prior to positioning outer tube 106 about inner tube 102, both can be bent to have a common bend radius.

Figure 11:
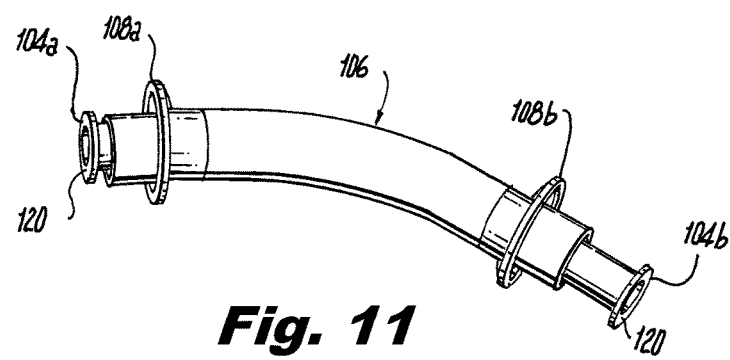

As indicated in FIG. 11, a second sleeve fitting 104b is mounted, e.g., by butt welding, to an end of the inner tube 102 opposite the first sleeve fitting 104a. The mounting of the sleeve fittings 104a and 104b can be inspected at this stage, e.g., the welds can be inspected using X-ray techniques. Positioning outer tube 106 and collar fittings 108a and 108b about inner tube 102 can include sliding the collar fittings 108a and 108b over outer tube 106 and positioning outer tube 106 proximate first sleeve fitting 104a to clear an end area of inner tube 102 for butt welding the second sleeve fitting 104b to the inner tube 102. To facilitate mounting sleeve fitting 104b to inner tube 102, the length of outer tube 106 is shorter than the distance between flanges 120 of the sleeve fittings 104a and 104b. The fact that collar fittings 108a and 108b are axially longer than sleeve fittings 104a and 104b be helps compensate for the difference in length between the inner and outer tubes 102 and 106. Outer tube 106 is shorter than inner tube 102, so by positioning outer tube 106 and collar fittings 108a and 108b away from sleeve fitting 104b, the joint area is accessible for welding or otherwise mounting sleeve fitting 104b to inner tube 102.

Figure 12:
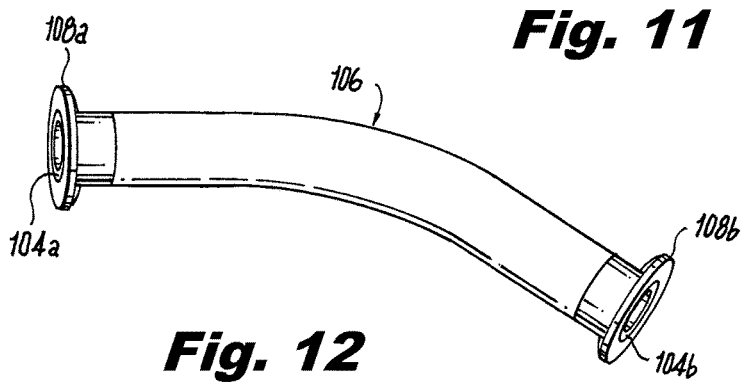

As indicated in FIG. 12, the method also includes mounting a first one of the collar fittings, e.g., collar fitting 108a, to an end of the outer tube 106 and mounting a second one of the collar fittings, e.g., collar fitting 108b, to an end of the outer tube 106 opposite the first collar fitting. The collar fittings 108a and 108b can be mounted using fillet welding, full penetration offset welding, brazing, or any other suitable process, and the joints can be visually inspected. Mounting the second collar fitting 108b can include seating the first and second sleeve fittings 104a and 104b against the first and second collar fittings 108a and 108b, respectively. This can suspend the inner tube 102 with a passage, e.g., passage 118 shown in FIG. 1, defined between inner tube 102 and outer tube 106.

In the exemplary embodiment shown in FIG. 8, the first sleeve fitting 104a can be mounted to an end of an inner tube 102. An outer tube 106 and a collar fitting 108a can be positioned about of inner tube 102. A coupling interface can be mounted to an end of the inner tube 102 opposite the first sleeve fitting 104a, and an end of the outer tube 106 can be mounted to the coupling interface as well. The collar fitting 108a can be mounted to an end of outer tube 108a opposite the coupling interface.

Figure 13:
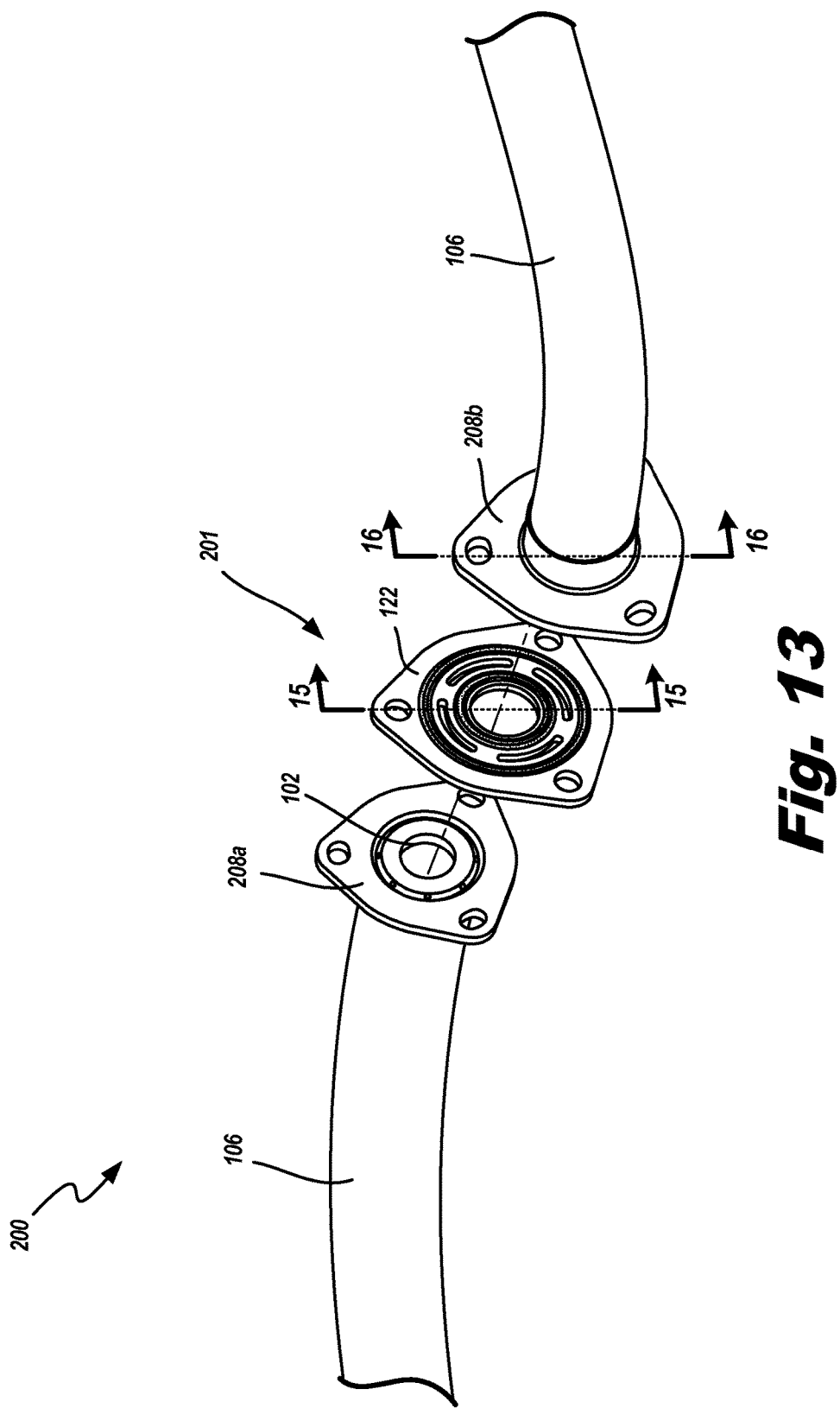
FIG. 13 is an exploded isometric view of a double wall tube and fitting assembly.

FIG. 13 is an exploded isometric view of double wall tube assembly 200, which includes inner tube 102, outer tube 106, and fastening assembly 201. Fastening assembly 201 includes seal assembly 122, and fitting assemblies 208a and 208b.

Fitting assemblies 208a and 208b are identical. Also, seal assembly 122 has two sides which are identical. Inner tubes 102 connect to an inner sleeve connection (shown later) of fitting assemblies 208a and 208b. Outer tubes 106 surround inner tubes 102. Outer tubes 106 connect to an outer fitting (shown later) of fitting assemblies 208a and 208b.

Fitting assemblies 208a and 208b are fastened together. Seal assembly 122 is fastened between assemblies 208a and 208b and is compressed by pressure applied by fitting assemblies 208a and 208b and fasteners (not shown). Fitting assemblies 208a and 208b together with seal assembly 122 create a union between inner tubes 102 and a union between outer tubes 106. The union fixes the position to inner and outer tubes 102 and 106 relative to each other, fitting assemblies 208a, and 208b, and seal assembly 122. Inner and outer tubes 102 and 106 cannot move axially or radially relative to each other when assembled to fitting assemblies 208a and 208b. The unions created allow for pressurized fluid to flow between inner tubes 102 without travelling to the unpressurized section of outer tubes 106.

In one embodiment of operation, pressurized fluid flows through inner tube 102 and passes through fitting assembly 208b. The pressurized fluid then flows through seal assembly 122 before reaching fitting assembly 208a. Pressurized fluid may also flow in the opposite direction of the above described flow path.

Additionally, unpressurized fluid may flow through outer tube 106 and pass through fitting assembly 208b. The unpressurized fluid can then flow through seal assembly 122 before reaching fitting assembly 208a. The unpressurized fluid may also flow in the opposite direction of the above described flow path.

Fitting assemblies 208a and 208b, seal assembly 122, inner tubes 102, and outer tubes 106 are constructed out of metal. These components are all constructed out of the same metal for manufacturing ease and the avoidance of galvanic action between the metals. For example nickel or titanium alloys can be used. Steel alloys, including stainless steels such as AMS5557 SST can also be used.

Figure 14:
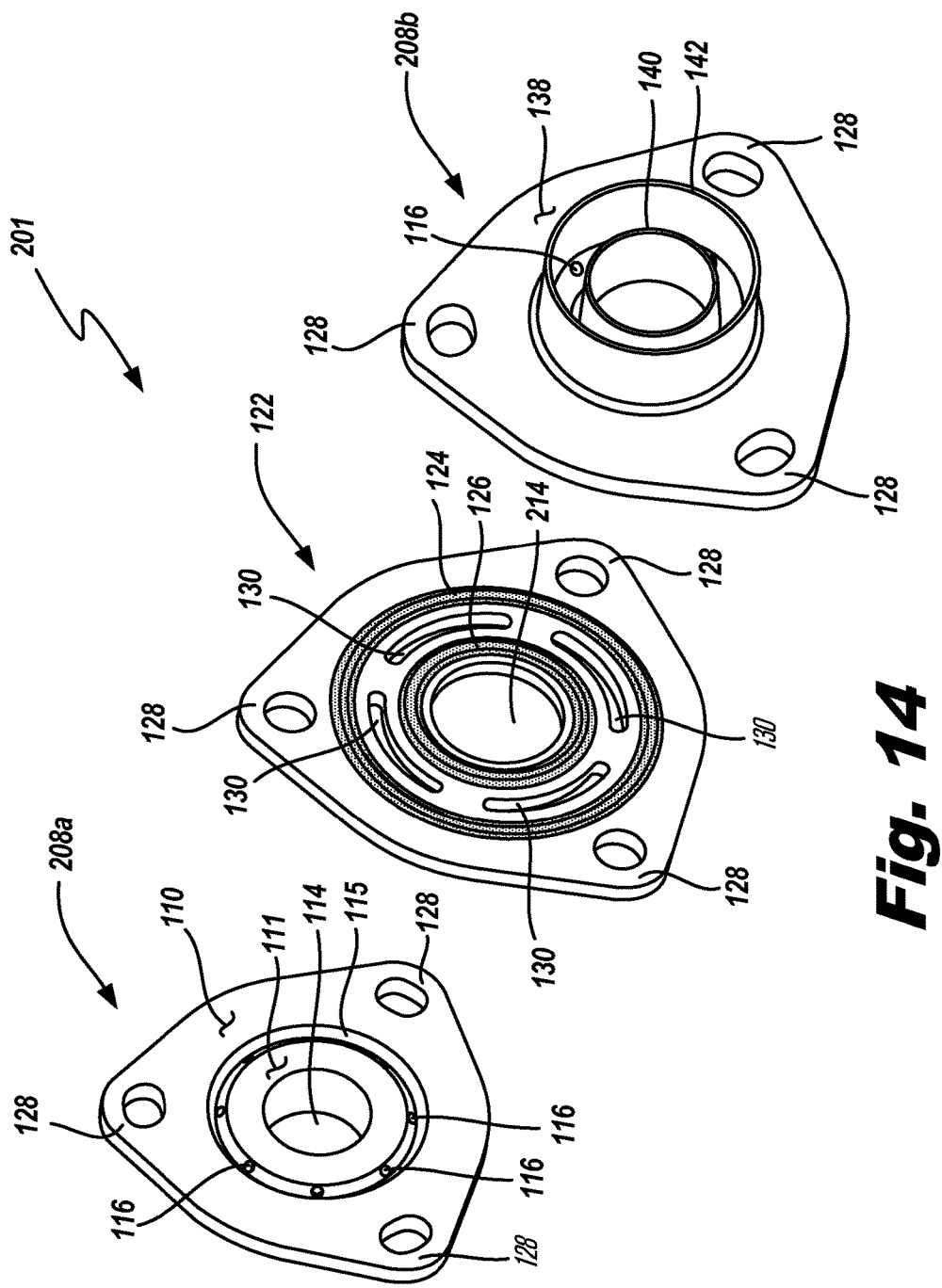
FIG. 14 is an exploded isometric view of the fitting assembly of FIG. 13.

FIG. 14 is an exploded isometric view of fastening assembly 201, which includes fitting assemblies 208a and 208b and seal assembly 122. Seal assembly 122 includes outer seal 124, inner seal 126, mounts 128, and slot passages 130, and center port 214. Fitting assemblies 208a and 208b include outer mounting surface 110, inner mounting surface 111, center port 114, secondary groove 115, secondary passages 116, mounts 128, connection surface 138, inner connection 140, and outer connection 142.

Seal assembly 122 and fitting assemblies 208a and 208b resemble an irregular, rounded, hexagonal prism. However, any shape may be used so long as the shape provides the features and functions of the present disclosure.

Center port 214 of seal assembly 122 is a circular bore through the center of seal assembly 122. Inner seal 126 annularly circumscribes center port 214. Inner seal 126 is spaced closely to center port 214. Located radially outboard of inner seal 126 are slot passages 130, which are spaced closely to inner seal 126. Slot passages 130 extend through seal assembly 122 and together form an incomplete circle surrounding inner seal 126; however, the circle is not complete, leaving material of seal assembly 122 circumferentially spacing slot passages 130. In this embodiment there are four of slot passages 130; however, more or less may be used. Located radially outboard of slot passages 130 is outer seal 124, which is also annular. Outer seal 124 is spaced closely to slot passages 130. Outer seal 124 is located radially inboard of mounts 128. Inner seal 126 and outer seal 124 are both flexible materials commonly used for sealing or gasketing. For example, inner seal 126 and outer seal 124 may be made of a vulcanized rubber or polymer.

Mounts 128 of seal assembly 122 are located near the perimeter of seal assembly 122 and are equally spaced relative to one another and are equally spaced, radially, from the center of seal assembly 122. In this embodiment, three mounts are shown; however more or fewer may be used. Mounts 128 includes bores which pass through mounts 128. The bores of mounts 128 of seal assembly 122 are circular.

Center port 114 is a circular bore through the center of fitting assemblies 208a and 208b. Surrounding center port 114 is inner connection 140. Inner connection 140 is a cylindrical protuberance, which extends orthogonally away from connection surface 138, or a sleeve fitting. Spaced radially outboard from inner connection 140 is outer connection 142, which is also a cylindrical protuberance extending orthogonally away from connection surface 138. Outer connection 142 completely surrounds inner connection 140.

Located radially between outer mounting surface 110 and inner mounting surface 111 is secondary groove 115. Secondary groove 115 completely separates inner and outer mating surfaces 111 and 110. Secondary groove 115 extends into seal assemblies 208a and 208b from outer mounting surface 110 and inner mounting surface 111. Secondary groove 115 does not pass entirely through seal assemblies 208a and 208b; however, secondary passages 116, which begin in secondary groove 115, do extend through seal assemblies 208a and 208b. Secondary passages 116 are round bores that begin at the radially inner surface of secondary groove 115 and extend through seal assemblies 208a and 208b through connection surface 138 between inner connection 140 and outer connection 142. Eight of secondary passages 116 are shown; however, more, or less may be used depending on the application.

Mounts 128 of fitting assemblies 208a and 208b are located near the perimeter of fitting assemblies 208a and 208b, and are equally spaced relative to one another and are equally spaced, radially, from the center of fitting assemblies 208a and 208b. In this embodiment, three mounts are shown; however more or fewer may be used. Mounts 128 includes bores which pass through mounts 128. The bores of mounts 128 of fitting assembly 208a and 208b are shown as slots. However, kidney bean slots or circular bores may also be used.

Fitting assemblies 208a and 208b connect to each other with seal assembly 122 between fitting assemblies 208a and 208b. Fitting assembly 208a mounts to one side of seal assembly 122 and fitting assembly 208b mounts to the other side of seal assembly 122. When connected, outer mounting surface 110 makes contact with the surface of seal assembly 122. Also, outer surface 110 contacts, and compresses, outer seal 124. Inner mounting surface 111 also makes contact with the surface of seal assembly 122. Similarly, inner mounting surface 111 contacts, and compresses, inner seal 126. Secondary groove 115 aligns with slot passages 130. The opening of groove 115 is aligned entirely between inner and outer seals 126 and 124. Fitting assembly 208b connects to seal assembly 122 in the same manner, but on the opposite side of seal assembly 122.

When fitting assemblies 208a and 208b connect to compress seal assembly 122 between them, fasteners pass through mounts 128 of fitting assembly 208a, mounts 128 of seal assembly 122, and through mounts 128 of fitting assembly 208b. The fasteners can then be tightened, drawing fitting assemblies 208a and 208b together and compressing inner and outer seals 126 and 124 on both sides of seal assembly 122.

Fitting assemblies 208a and 208b and seal assembly 122 (apart from inner and outer seals 124 and 126) are each single pieces which are each formed from a single block of material. For example, fitting assembly 208a is machined from a single billet of stainless steel. Other methods of manufacturing can be used to form fitting assemblies 208a and 208b, such as casting, as operating conditions allow.

Figure 15:
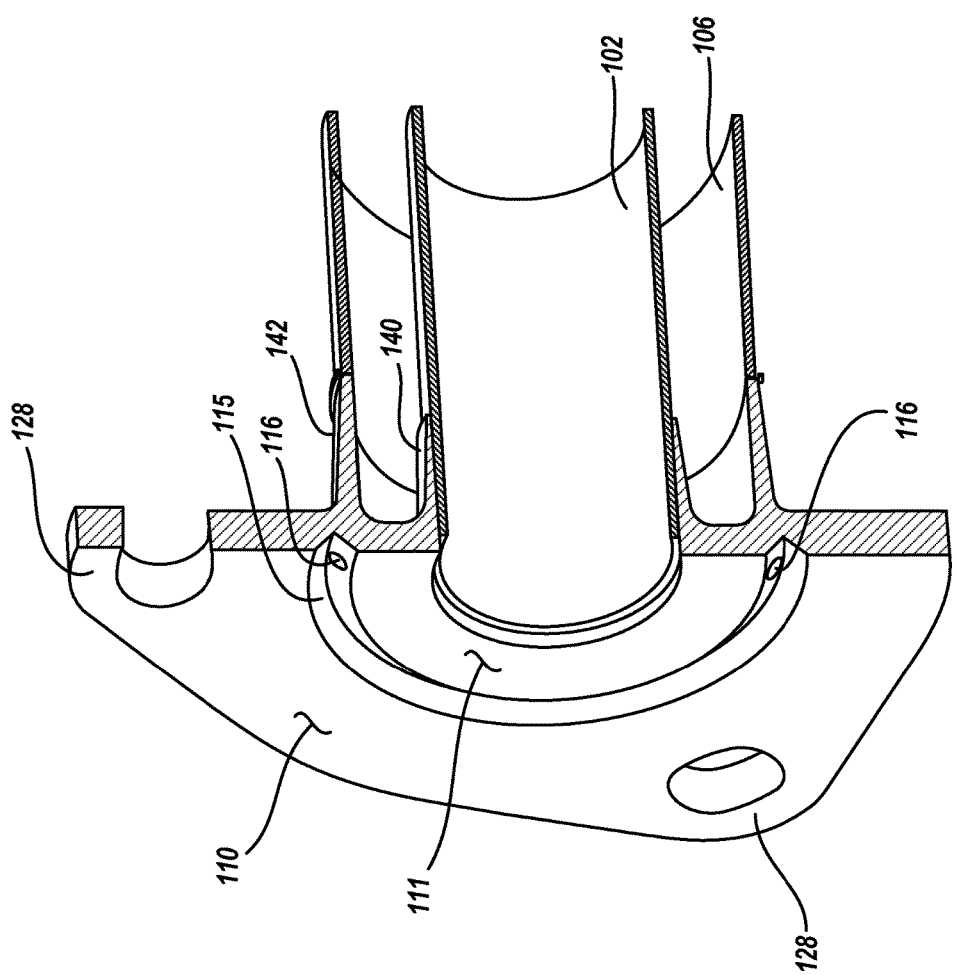
FIG. 15 is a sectional view of one of the fittings of the fitting assembly of FIG. 13.

FIG. 15 is an isometric sectional view of section 15-15 of fitting assembly 208a of FIG. 13. However, FIG. 15 also includes inner and outer tubes 102 and 106 of FIG. 13. Fitting assembly 208a includes outer mounting surface 110, inner mounting surface 111, center port 114, secondary groove 115, secondary passages 116, mounts 128, inner connection 140, and outer connection 142.

The components of fitting assembly 208a are connected consistently with FIGS. 13 and 14; however, FIG. 15 further illustrates the connection of inner tube 102 and outer tube 106 to fitting assembly 208a.

Inner tube 102 inserts into inner connection 140 of fitting assembly 208a. Inner connection 140 is designed so that its inner diameter (the diameter of fitting center bore 114) is large enough to allow tube inner 102 to be inserted, while leaving very little clearance between the outside of inner tube 102 and inside of inner connection 140. Inner tube 102 is inserted into inner connection 140 until it nearly reaches inner mounting surface 111. For example, inner tube 102 may be 0.05 to 0.20 inches (1.27 to 2.08 mm) away from the inner diameter of inner mounting surface 111. However, inner tube 102 may also be inserted past mounting surface 111 as well. Inner tube 102 is brazed to inner connection 140. Outer tube 106 is butted to outer connection 142, which is tapered for receiving outer tube 106. Outer tube 106 is butt welded to outer connection 142. Outer connection 142 may have a receiving collar in other embodiments.

In manufacturing tube assembly 200, inner tube 102 has braze material (or brazing paste) applied to the outside of the end of inner tube 102 that is to be inserted into inner sleeve connection 140. Inner tube 102 is then inserted into inner sleeve connection 140. Next, outer tube 106 is slid over inner tube 102 and is butted up to outer connection 142. Then, outer tube 106 is butt welded to outer connection 142. Other types of welds may be used in other embodiments of tube assembly 200. After welding outer tube 106 to outer connection 142, the assembly is placed in a brazing furnace or oven to braze inner tube 102 to inner sleeve connection 140. Thereafter, further steps, such as weld treatment, weld cleanup, and other finishing steps are performed.

One manufacturing benefit of having a brazed inner tube connection to the fitting is that it addresses shrinkage concerns. Because there are shrinkage concerns when welding or brazing parts together, brazing inner tube 102 to inner connection 140 allows inner tube 102 to be made longer than necessary for placement of the tube in inner connection 140 where inner tube 102 protrudes through the end of fitting assembly 208. Then when inner tube 102 settles out (meaning the length is finalized following thermal expansion and contraction from welding and brazing processes), and all shrinkage is accounted for, gaps or excessive pre-loads between inner tubes 102 are reduced. Any additional inner tube 102 can simply be trimmed off to a desired length.

Figure 16:
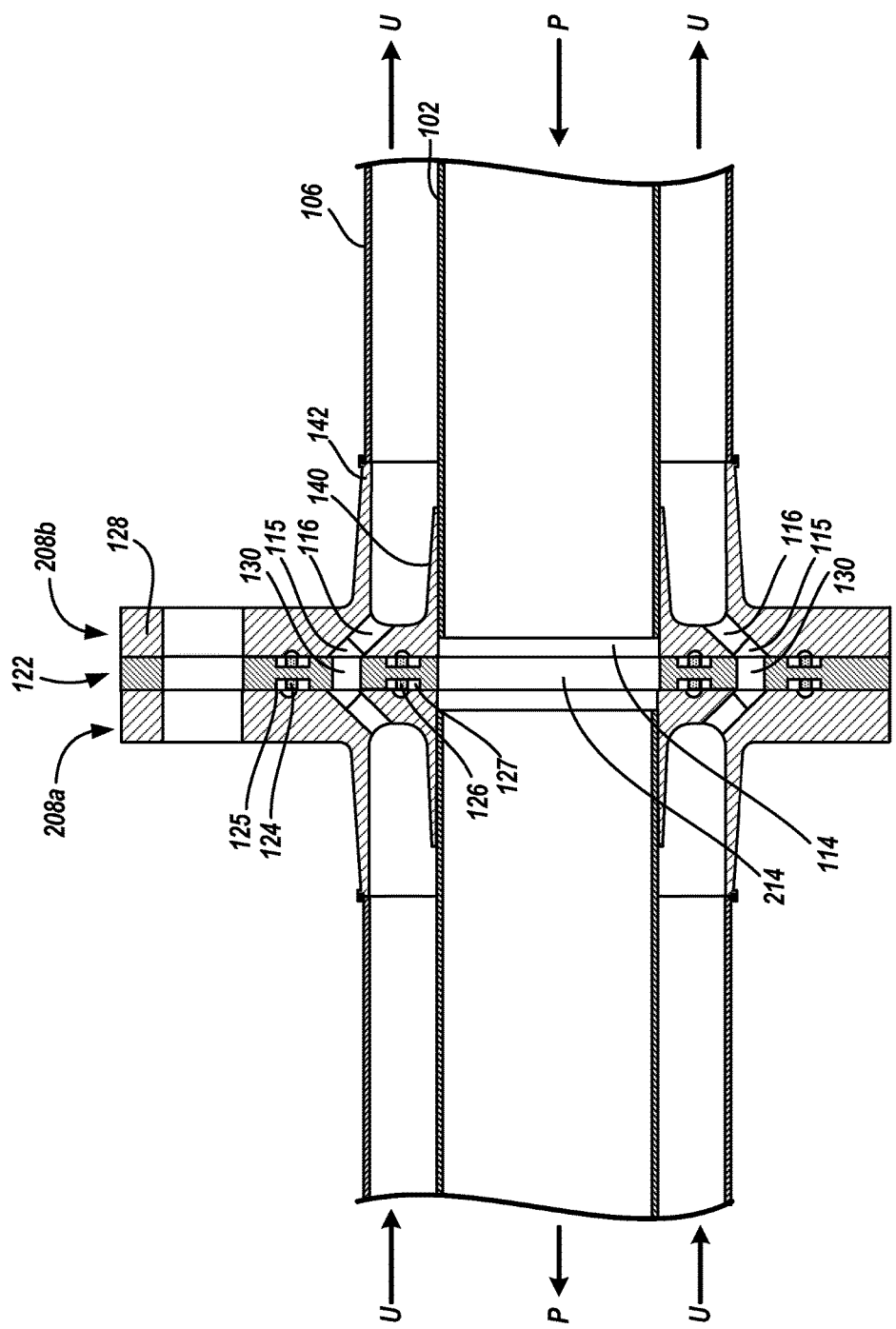
FIG. 16 is a sectional view of the fitting assembly of FIG. 13.

FIG. 16 is a sectional view of tube assembly 200 at section 16-16 of FIG. 13. Tube assembly 200 includes inner tubes 102, outer tubes 106 and fastening assembly 201. Fastening assembly 201 includes fitting assemblies 208a and 208b and seal assembly 122. Seal assembly 122 includes outer seal 124, outer seal groove 125, inner seal 126, inner seal groove 127, mounts 128, slot passages 130, and center port 214. Fitting assemblies 208a and 208b include outer mounting surface 110, inner mounting surface 111, center port 114, secondary groove 115, secondary passages 116, mounts 128, connection surface 138, inner connection 140, and outer connection 142. FIG. 16 also shows fluid flow P and unpressurized fluid flow U.

The connection of the components of tube assembly 200 is consistent with FIGS. 13-15; however, FIG. 16 provides further detail of tube assembly 200, specifically of fastening assembly 201. Seal assembly 122 includes inner seal groove 127, which is a groove milled or otherwise machined into both faces of seal assembly 122. Inner seal groove 127 is annular and located radially outboard of seal center port 214. Outer seal groove 125 is similar to inner seal groove, but is located radially outboard of inner seal groove 127. Inner seal groove 127 receives and retains inner seal 126. Inner seal groove 127 is radially larger than inner seal 126. Similarly, outer seal groove 125 receives and restrains outer seal 124 and is radially larger than inner seal 126.

As previously described, fitting assemblies 208a and 208b connect to inner tubes 102 through inner connections 140. For example inner tube 102 connects to inner connection 140 of fitting assembly 208b (right hand connection). Inner tube 102 is inserted into inner connection 140 from the connection surface side of fitting assembly 208b and extends most of the way through inner connection 140, but stops before reaching the inner diameter of inner mounting surface 111. As previously discussed, this connection is secured by a furnace or oven braze process.

When fitting assemblies 208a and 208b are mated to seal assembly 122, seal center port 214 and center port 114 of fitting assemblies 208a and 208b are in axial alignment. However, seal center port 214 has a diameter slightly larger than the diameter of fitting center ports 114 of assemblies 208a and 208. Because tubes 102 have an inner diameter smaller than center port 114 of fitting assemblies 208a and 208, which have a smaller diameter than seal port 214, the transition between tubes 102 is not linear or smooth, but is tiered.

As previously described, outer tubes 106 are butt welded to outer connections 142 of fitting assemblies fitting assemblies 208a and 208b. Because tubes 106 and outer connections 142 have the same inner diameter, the transition between these components is smooth.

When fasteners are passed through mounts 128 of fitting assemblies 208a and 208b and seal assembly 122 and tightened to pull fitting assemblies 208a and 208b to mate to seal assembly 122, inner seals and outer seals 126 and 124 are compressed by outer and inner mounting surfaces 110 and 111, respectively. The compressive forces applied to outer and inner seals 124 and 126 can cause outer and inner seals 124 and 126 to expand radially against mounting surfaces and within inner and outer seal grooves 127 and 125, respectively. This compression of inner and outer seals 126 and 124 provides fluid tight seals between seal assembly 122 and fitting assemblies 208a and 208b.

With fitting assemblies 208a and 208b securely mated to seal assembly 122, two flow paths are formed through fastening assembly 201. The first flow path connects inner tubes 102 through inner connections 140 and seal center port 214. The first flow path is sealed by the brazed connections between inner tubes 102 and inner connections 140, and is sealed by inner gaskets 126.

The second flow path connects outer tubes 106. For example, tube 106 is connected to outer connection 142 of fitting assembly 208a, which connect to secondary passages 116. Secondary passages 116 pass through fitting assembly 208a from between inner connection 140 and outer connection 142, to secondary groove 115 between inner and outer seal surfaces 111 and 110. Secondary groove 115 is aligned with slot passages 130 of seal surface 122, which aligns with secondary groove 115 of fitting assembly 208b. Secondary groove 115 of fitting assembly 208b connects to secondary passages 116, which terminate between inner and outer connections 140 and 142 of fitting assembly 208b. Outer connection 142 connects to outer tube 106. Essentially, flow can pass from outer tube 106 to the space between inner and outer connections 140 and 142 of fitting assembly 208a. Flow can then continue to secondary passages 116 before continuing to secondary groove 115 of fitting assembly 208a and pass to secondary groove 115 of fitting assembly 208b through slot passages 130 of seal plate 122. Flow then continues to secondary passages 116 of fitting assembly 208b and exits between inner and outer connections 140 and 142 before continuing to outer tube 106. The second path is sealed by inner and outer seals 124 and 126 and the butt weld connections between outer connections 142 and outer tubes 106.

In the operation of one embodiment, inner tubes 102 pass fluid flow P to each other through the first flow path described above. Typically, this flow is a pressurized liquid, such as gas, oil, or water. In normal operation, fluid flow P travels through inner tube 102, briefly into fitting assembly 208b, seal assembly 122, and fitting assembly 208a, before continuing to inner tube 102. While in fastening assembly 201, fluid flow P will encounter multiple changes in diameter. The diameter of seal center port 214 is larger than center ports 114 and inner tubes 102 to minimize pressure drop through fitting assembly 201 due to flow restrictions. This also reduces manufacturing interference when inner tube 102 extends through fitting assemblies 208a or 208b.

In normal operation of one embodiment, no flow will travel through the second flow path. However, in the case of a failure of one of inner tubes 102, or a connection between inner tubes 102 and another component, some of fluid flow P may escape into outer tube 106 becoming unpressurized fluid flow U. Outer tubes 106, which operates at ambient pressure, pass unpressurized fluid flow U through fastening assembly 201 and onto a collection or inspection apparatus. This embodiment offers the benefit of preventing and collecting the leaking of fluid flow P.

Also, this embodiment benefits from the use of a single piece fitting assembly. Fitting assemblies 208a and 208b are, as described above, formed from a single piece of material. This reduces the number of parts in the assembly, which reduces time to assemble and reduces the likelihood of component failure.

Secondary groove 115, which partially creates the second flow path above, provides several functions and benefits. First, secondary groove 115 helps to create the second flow path described above by enabling secondary passages 116 of fitting assembly 208a to connect to secondary passages 116 of fitting assembly 208b. Because inner seal 126 needs to seal fluid flow P, inner seal 126 needs to be create a fluid tight seal in close proximity to seal center port 214 and fitting center ports 114. To accomplish this, inner seal 126 contacts mounting surface 111 adjacent to seal center port 214 and fitting center ports 114. Because of the location of the seal, outer tubes 106 cannot be linearly connected through fastening assembly 201. As a solution, secondary flow passages 116 are drilled at angles through fitting assemblies 208a and 208b and slot passages 130 are located radially outboard of outer connection 142, where the secondary flow passages 116 of fitting assemblies 208a and 208b align. This allows for the flow path for unpressurized flow U to connect within fastening assembly U, despite routing interference caused by the location of inner seal 126.

Also, secondary groove 115 improves the manufacturability of fitting assemblies 208a and 208b. As described above, secondary flow paths 116 need to be drilled at angles through fitting assemblies 208a and 208b. This can be a difficult manufacturing process. By offering a surface perpendicular to the drilling angle, secondary groove 115 improves the accuracy, consistency, and ease of completing this process.

Secondary groove 115 also offers the benefit of correcting misalignment in installation and manufacturing errors. Secondary flow passages are drilled in minimal locations. While allowing flow through fastening assembly 201 is desired, drilling several holes equally spaced circumferentially through fitting assemblies 208a and 208b, and at the same radius, reduces the rigidity of fitting assemblies 208 and 208b and adds manufacturing cost to these parts. Therefore, a balance is struck between allowing flow, increasing the manufacturing cost, and decreasing rigidity of fitting assemblies 208a and 208b. One side-effect is that secondary flow paths 116 may not always align between fitting assemblies 208a and 208b. This could be because flow paths 116 were manufactured improperly, or because fitting assemblies 208 and 208b were improperly installed. Regardless, when secondary flow paths 116 are not in perfect alignment, secondary groove 115 will pass fluid circumferentially. Slot passages 130 also play a role in this process. For example, when unpressurized fluid U flows into secondary passage 116 of fitting assembly 208a secondary groove 115 may distribute unpressurized fluid U circumferentially through secondary groove 115. Secondary groove 115 may then pass the unpressurized fluid flow U to slot passages, which pass unpressurized fluid flow U to secondary groove 115 and secondary passages 116 of fitting assembly 208b. This process overcomes errors in manufacturing and assembly, and also acts to balance the flow through secondary passages 116.

In other embodiments, a pump may be used to collect unpressurized fluid flow U for reuse within a system. In another embodiment, unpressurized flow may be pressurized flow of a fluid that is the same or different than fluid flow P. These fluids may be placed in a double wall tube system to save space. In another embodiment, fluid flow P and unpressurized fluid flow U may be fluids that are of different temperatures placed adjacently to exchange heat between the fluids.

Though the disclosure describes a double wall tube system carrying a pressurized flammable fluid, the methods of this disclosure can be applied to any double wall tube system having multiple pieces or requiring fittings.

DISCUSSION OF POSSIBLE EMBODIMENTS

The following are non-exclusive descriptions of possible embodiments of the present invention.

A flange fitting for attaching to double wall tubes includes a fitting center port, a plurality of fitting mounts, inner and outer seal surfaces, fluid communication ports, and a connections surface. The fitting center port extends through the fitting for passing a primary fluid flow. The fitting mounts are spaced radially away from the center port for receiving fasteners. The inner and outer seal surfaces are predominantly flat. The fluid communication ports pass a secondary fluid flow and extend through the fitting from between the inner and outer seal surfaces to the connection surface between the inner sleeve connection and the outer connection. The connection surface is on a side of the fitting opposing the seal surfaces. The connection surface includes an inner sleeve connection protruding from the connection surface surrounding the center port for receiving an inner tube and an outer connection protruding from the connection surface surrounding the inner sleeve connection for receiving an outer tube.

The flange fitting of the preceding paragraph can optionally include, additionally and/or alternatively, any one or more of the following features, configurations and/or additional components.

The seal surface can include a groove extending axially from between the inner and outer seal surfaces into the fitting.

The fluid communication ports can extend through the fitting from a surface of the groove through the connection surface between the inner sleeve connection and the outer connection.

There can be eight fluid communication ports.

The fitting can be formed of a single piece.

The fitting mounts can be slots.

The fitting material can be one of a titanium alloy, stainless steel alloy, or nickel alloy.

A flange fitting assembly for connecting double wall tubes includes a first and second flange fitting for connecting to first and second double wall tubes, respectively, and to each other and a seal plate for mounting between the first flange fitting and second flange fitting. Each flange fitting includes a fitting center port, a plurality of fitting mounts, inner and outer seal surfaces, fluid communication ports, and a connections surface. The fitting center port extends through the fitting for passing a primary fluid flow. The fitting mounts are spaced radially away from the center port for receiving fasteners. The inner and outer seal surfaces are predominantly flat. The fluid communication ports pass a secondary fluid flow and extend through the flange fitting from between the inner and outer seal surfaces to the connection surface between the inner sleeve connection and the outer connection. The connection surface is on a side of the flange fitting opposing the seal surfaces. The connection surface includes an inner sleeve connection protruding from the connection surface surrounding the center port for receiving an inner tube and an outer connection protruding from the connection surface surrounding the inner sleeve connection for receiving an outer tube. Each seal plate includes a plate center port, a plurality of plate mounts, a plurality of slots, a first and second side, and an inner and outer seal. The plate center port has an axis that is in alignment with a center axis of the fitting center port. The plurality of plate mounts is for receiving fasteners. The plate mounts are spaced radially away from the plate center port. The plurality of slots extend through the seal plate, located between the inner and outer seal of each side for passing a secondary fluid flow between the fluid communication ports of the first and second fittings. The first and second sides are identical. Each side of the seal plate includes an inner seal circumscribing the plate center port and an outer seal located radially between the plate mounts and the inner seal.

The assembly of the preceding paragraph can optionally include, additionally and/or alternatively, any one or more of the following features, configurations and/or additional components.

Each seal surface of the first and second flange fitting can comprise a groove extending axially from between the inner and outer seal surfaces into the flange fitting, and the fluid communication ports can extend through the flange fitting from a surface of the groove through the connection surface between the inner sleeve connection and the outer connection.

The first and second flange fittings can each be formed of a single piece.

The channels of the seal plate can be configured to allow fluid to pass between the fluid communication ports of the first and second flange fittings without aligning the fluid communication ports of the first and second flange fitting.

A diameter of the plate center port can be larger than a diameter of the fitting center ports of the first and second flange fittings.

Each side of the seal plate can have an annular groove for securing the inner seal, and each side of the seal plate can have an annular groove for securing the outer seal.

The inner and outer seal can expand to fill their grooves when the fittings are mated to the seal plate and apply pressure compressing the inner and outer seals.

The inner and outer seals can be vulcanized.

The seal plate can have four slots.

The outer tube can carry a fluid at an ambient pressure and the inner tube can carry another fluid at an operational pressure.

A method of manufacturing a double wall tube and flange fitting assembly includes applying braze material to a first end of an inner tube. Then the inner tube is inserted into an inner sleeve connection of a first flange fitting. Next, the outer tube is slid over the inner tube and the outer tube is butted against an outer connection of the first flange fitting. Then the outer tube is welded to the outer connection and the first end of the inner tube is brazed to the inner sleeve connection.

The method of the preceding paragraph can optionally include, additionally and/or alternatively, any one or more of the following features, configurations and/or additional components, or steps.

A second flange fitting and a seal plate can be fastened to the first flange fitting.

The first flange fitting can be machined from a single billet, and the second flange fitting can be machined from another single billet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flange fitting for attaching to double wall tubes, the fitting comprising:
   a fitting center port extending through the fitting for passing a primary fluid flow;
   a plurality of flange fitting mounts spaced radially away from the center port for receiving fasteners;
   an inner seal surface and an outer seal surface that are predominantly flat;
   a connection surface on a side of the fitting opposing the inner and outer seal surfaces, the connection surface comprising:
      an inner sleeve connection protruding from the connection surface surrounding the center port for receiving an inner tube; and
      an outer connection protruding from the connection surface surrounding the inner sleeve connection for receiving an outer tube;
   a plurality of fluid communication ports for passing a secondary fluid flow, wherein the fluid communication ports extend through the flange fitting from between the inner and outer seal surfaces to the connection surface between the inner sleeve connection and the outer connection; and
   a circumferential groove between the inner and outer seal surfaces and radially outboard of the outer connection, wherein the fluid communication ports extend at an angle through the fitting from the groove to a portion of the connection surface located between the inner sleeve connection and the outer connection.

2. The flange fitting of claim 1, wherein there are eight fluid communication ports.

3. The flange fitting of claim 1, wherein the fitting is formed of a single piece.

4. The flange fitting of claim 1, wherein the fitting mounts are slots.

5. The flange fitting of claim 1, wherein the fitting material is one of a titanium alloy, stainless steel alloy, or nickel alloy.

6. A flange fitting assembly for attaching to and connecting double wall tubes, the fitting assembly comprising:
   a first flange fitting and a second flange fitting for connecting to first and second double wall tubes, respectively, and to each other, each flange fitting comprising:
      a fitting center port extending through the fitting for passing a primary fluid flow;
      a plurality of fitting mounts spaced radially away from the center port for receiving fasteners;
      an inner seal surface and an outer seal surface that are predominantly flat;
      a connection surface on a side of the flange fitting opposing the inner and outer seal surfaces, the connection surface comprising:
         an inner sleeve connection protruding from the connection surface surrounding the center port for receiving an inner tube; and
         an outer connection protruding from the connection surface surrounding the inner sleeve connection for receiving an outer tube; and
      a plurality of fluid communication ports for passing a secondary fluid flow, wherein the fluid communication ports extend through the flange fitting from between the inner and outer seal surfaces to the connection surface between the inner sleeve connection and the outer connection; and
   a seal plate for mounting between the first flange fitting and second flange fitting, the seal plate comprising:
      a plate center port having an axis that is in alignment with a center axis of the fitting center port;
      a plurality of plate mounts for receiving fasteners, wherein the plate mounts are spaced radially away from the plate center port;
      a first side and a second side, wherein the first and second sides are identical, each side of the seal plate comprising:

an inner seal circumscribing the plate center port; and an outer seal located radially between the plate mounts and the inner seal; and a plurality of slots extending through the seal plate, located between the inner and outer seal of each side for passing a secondary fluid flow between the fluid communication ports of the first and second fittings.

7. The flange fitting assembly of claim 6, wherein the first flange fitting and the second flange fitting each comprise a circumferential groove between the inner and outer seal surfaces, and wherein the fluid communication ports extend through the flange fitting the groove to a portion of the connection surface located between the inner sleeve connection and the outer connection.

8. The assembly of claim 6, wherein the first and second flange fittings are each formed of a single piece.

9. The assembly of claim 6, wherein the plurality of slots of the seal plate are configured to allow fluid to pass between the fluid communication ports of the first and second flange fittings without aligning the fluid communication ports of the first and second flange fitting.

10. The assembly of claim 6, wherein a diameter of the plate center port is larger than a diameter of the fitting center ports of the first and second flange fittings.

11. The assembly of claim 6, wherein each side of the seal plate has an annular groove for securing the inner seal, and wherein each side of the seal plate has an annular groove for securing the outer seal.

12. The assembly of claim 11, wherein the inner and outer seal expand to fill their grooves when the fittings are mated to the seal plate and apply pressure compressing the inner and outer seals.

13. The assembly of claim 11, wherein the inner and outer seals are vulcanized.

14. The assembly of claim 6, wherein the seal plate has four slots.

15. The assembly of claim 6, wherein the secondary fluid flow is a fluid at an ambient pressure and the primary fluid flow is another fluid at an operational pressure.

* * * * *